United States Patent
Aelker et al.

(10) Patent No.: US 9,802,307 B2
(45) Date of Patent: Oct. 31, 2017

(54) LOCKING INTERMEDIATE LINK FOR A TOOL ARM ASSEMBLY

(71) Applicant: Lockheed Martin Corporation, Bethesda, MD (US)

(72) Inventors: Patricia A. Aelker, Longwood, FL (US); Gavin A. Barnes, Saint Cloud, FL (US); Robert O. Brady, Sarasota, FL (US); Erik A. Holmen, Sarasota, FL (US); Steven D. MacFarlane, Bradenton, FL (US); Keith E. Maxwell, Tampa, FL (US); Jeffreys R. Nichols, Sarasota, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 42 days.

(21) Appl. No.: 14/843,344

(22) Filed: Sep. 2, 2015

(65) Prior Publication Data

US 2017/0057077 A1   Mar. 2, 2017

(51) Int. Cl.
*F16M 11/00* (2006.01)
*B25H 1/00* (2006.01)
*F16M 11/04* (2006.01)
*F16C 11/10* (2006.01)
*F16C 7/02* (2006.01)

(52) U.S. Cl.
CPC .......... *B25H 1/0035* (2013.01); *B25H 1/0028* (2013.01); *F16C 11/10* (2013.01); *F16M 11/04* (2013.01); *F16C 7/02* (2013.01); *F16C 11/103* (2013.01)

(58) Field of Classification Search
CPC .... F16M 11/10; F16M 13/02; F16M 11/2092; F16M 11/2014; F16M 2200/044; F16M 11/24; F16M 11/2021; F16M 2200/063; F16M 13/022; F16M 2200/041; F16M 13/00; F16M 2200/024; F16M 11/2064; F16M 11/08
USPC .................. 248/276.1, 278.1, 284.1, 371
See application file for complete search history.

(56) References Cited

U.S. PATENT DOCUMENTS

| 4,156,512 A | 5/1979 | Brown |
| 4,394,075 A | 7/1983 | Brown et al. |
| 4,838,135 A | 6/1989 | Hevoyan |
| 6,030,130 A * | 2/2000 | Paddock ............ F16M 11/2014 248/278.1 |

(Continued)

FOREIGN PATENT DOCUMENTS

| CN | 2838881 Y | 11/2006 |
| JP | H08281577 | 10/1996 |
| KR | 10-2014-0026718 A | 3/2014 |

OTHER PUBLICATIONS

International Search Report and Written Opinion for International Patent Application No. PCT/US2016/049961, mailed Dec. 16, 2016, 15 pages.

*Primary Examiner* — Steven Marsh
(74) *Attorney, Agent, or Firm* — Withrow & Terranova, PLLC

(57) ABSTRACT

An intermediate link for a tool arm assembly is provided. The intermediate link includes first and second connectors that are at least partially rotatable about respective first and second rotation axes. The intermediate link includes first and/or second lock rotation mechanisms that are configured to selectively prevent rotation of the first and second connectors.

21 Claims, 7 Drawing Sheets

(56) References Cited

U.S. PATENT DOCUMENTS

| | | | | |
|---|---|---|---|---|
| 7,510,155 | B2* | 3/2009 | Huang | F16M 11/10 248/278.1 |
| 7,726,616 | B2* | 6/2010 | Zhang | F16M 11/2021 248/284.1 |
| 7,967,273 | B2* | 6/2011 | Zhou | F16M 11/2092 248/176.3 |
| 8,011,632 | B2* | 9/2011 | Wang | F16M 11/10 248/284.1 |
| 8,061,663 | B2* | 11/2011 | Wang | F16M 11/10 248/123.11 |
| 9,423,066 | B2* | 8/2016 | Wang | F16M 11/2014 |
| 2004/0026584 | A1 | 2/2004 | Libbey et al. | |
| 2008/0029670 | A1* | 2/2008 | Hung | F16M 11/041 248/278.1 |
| 2010/0065705 | A1* | 3/2010 | Brown | F16M 11/04 248/288.11 |
| 2013/0187022 | A1* | 7/2013 | Duportal | G01B 5/008 248/543 |

* cited by examiner

LOCKING INTERMEDIATE LINK FOR A TOOL ARM ASSEMBLY

TECHNICAL FIELD

The embodiments relate generally to a locking intermediate link for a tool arm assembly.

BACKGROUND

A tool arm assembly interfaces with and supports a tool to allow a human to easily manipulate the tool. A tool arm assembly may be coupled to a number of different systems, such as, for example, an exoskeleton, a stationary fixture such as a wall, or a mobile device such as a cart. A tool arm assembly typically includes one or more arm links that can move in a plane, such as a vertical plane, and intermediate links that couple the arm links and allow movement in another plane, such as a horizontal plane. With the flexibility provided by the multiple types of movement, a user may position the tool at precise locations.

An intermediate link allows arm links to rotate about an axis of rotation of the intermediate link. While this is useful for tool positioning, unintentional rotation of an arm link can occur when a user removes his hands from the tool, leading to safety issues and other problems as the tool moves in an unintended manner.

SUMMARY

The embodiments relate to an intermediate link for a tool arm assembly that includes first and second connectors that are at least partially rotatable about respective first and second rotation axes. The intermediate link includes first and/or second lock rotation mechanisms that are configured to selectively prevent rotation of the first and second connectors. Among other features, the embodiments allow a user of a tool arm assembly to selectively prevent rotation of arm links, or other links, and thereby ensure a tool does not unintentionally move if the user takes his hands off the tool.

In one embodiment, an intermediate link for a tool arm assembly is provided. The intermediate link includes a body having a first rotation axis and a second rotation axis. A first connector is coupled to the body. The first connector is at least partially rotatable about the first rotation axis. A second connector is coupled to the body and is also at least partially rotatable about the second rotation axis. A first rotation lock mechanism is configured to selectively prevent rotation of the first connector about the first rotation axis.

In one embodiment, the intermediate link comprises a second rotation lock mechanism that is configured to selectively prevent rotation of the second connector about the second rotation axis.

In one embodiment, the intermediate link includes a first shaft that is co-linear with the first rotation axis. The first shaft is fixed with respect to the first connector and rotatable with respect to the body. The first shaft comprises a lock interface area. The first rotation lock mechanism comprises a pin having a locked position and an unlocked position. In the locked position, the pin is engaged with the lock interface area to prevent rotation of the first shaft.

In one embodiment, the first shaft forms an opening, and the lock interface area comprises the opening. In the locked position, at least a portion of the pin extends into the opening.

In one embodiment, the body forms a threaded bore that is substantially perpendicular with respect to the first rotation axis. The threaded bore includes a longitudinal axis that intersects the first rotation axis. The pin includes threads that are configured to engage the threaded bore. A handle is attached to the pin. The pin extends substantially perpendicular with respect to the first rotation axis and is configured to contact the first shaft upon rotation of the pin.

In one embodiment, the first shaft comprises a flat surface and the lock interface area comprises the flat surface. The pin is configured to contact the flat surface.

In one embodiment, the first rotation lock mechanism has a first unlocked mode and a first locked mode. In the first unlocked mode, the first connector is at least partially rotatable about the first rotation axis, and in the first locked mode, the first connecter is fixed with respect to the body.

In one embodiment, the first rotation lock mechanism comprises a first pin that is slidably coupled to the body and is configured to slide along a first pin axis. The first connector comprises a first bracket forming at least one opening that intersects the first pin axis at a particular rotation orientation of the first connector with respect to the body. The first pin is configured to engage the at least one opening of the first bracket to prevent rotation of the first connector with respect to the body.

In one embodiment, the bracket forms a plurality of openings. Each opening intersects the first pin axis at corresponding rotation orientations of the first connector with respect to the body.

In one embodiment, the body forms a first pin through hole having a through-hole axis that is parallel to the first rotation axis. The first pin is configured to slide within the pin through hole to engage the at least one opening.

In one embodiment, a tool arm assembly is provided. The tool arm assembly includes a first arm link, a second arm link, and an intermediate link. The intermediate link comprises a body having a first rotation axis and a second rotation axis. A first connector is coupled to the body. The first connector is at least partially rotatable about the first rotation axis. A second connector is coupled to the body and is also at least partially rotatable about the second rotation axis. A first rotation lock mechanism is configured to selectively prevent rotation of the first connector about the first rotation axis.

In another embodiment, a tool arm assembly is provided that includes a tool interface link, a first arm link, a first intermediate link, a second arm link, and a second intermediate link.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The use herein of ordinals in conjunction with an element is solely for distinguishing what might otherwise be similar or identical labels, such as "first connector" and "second connector," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to an intermediate link for a tool arm assembly that includes first and second connectors that are at least partially rotatable about respective first and second rotation axes. The intermediate link includes first and second lock rotation mechanisms that are configured to selectively prevent rotation of the first and second connectors. Among other features, the embodiments allow a user of a tool arm assembly to selectively prevent rotation of arm links, or other links, and thereby ensure a tool does not unintentionally move if the user takes his hands off the tool.

Figure 1:
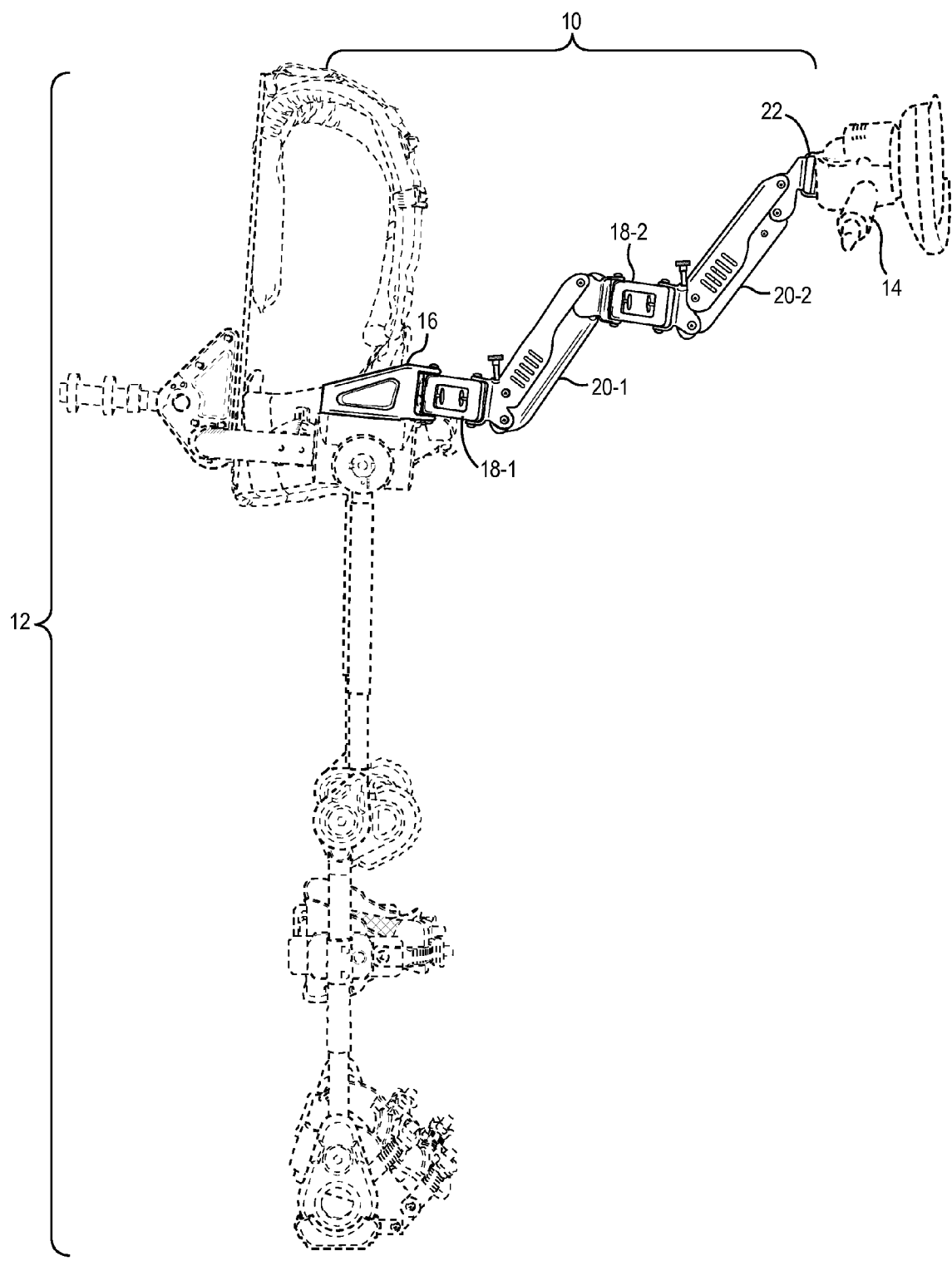
FIG. 1 is an illustration of a tool arm assembly according to one embodiment.

FIG. 1 is an illustration of a tool arm assembly 10 according to one embodiment. In this example, the tool arm assembly 10 is coupled to an exoskeleton 12; however, the embodiments are not limited to a tool arm assembly that is coupled to an exoskeleton and have applicability in any application that utilizes a tool arm assembly. For example, the tool arm assembly may be coupled to a stationary surface, such as a wall, a ceiling, a floor, or a bench, or to a mobile surface, such as a cart.

The tool arm assembly 10 can be coupled to a tool 14, and facilitates controlled and safe movement of the tool 14 by a user (not illustrated). The tool arm assembly 10 in this example includes a tool base link 16 that facilitates coupling of the tool arm assembly 10 to the exoskeleton 12. The tool base link 16 is coupled to an intermediate link 18-1, which in turn is coupled to an arm link 20-1. The arm link 20-1 is coupled to an intermediate link 18-2, which is coupled to an arm link 20-2. The intermediate links 18-1, 18-2 may be referred to generally herein as intermediate links 18. The arm links 20-1, 20-2 may be referred to generally herein as arm links 20. The arm link 20-2 includes a tool attachment interface 22 that facilitates coupling of the tool 14 to the tool arm assembly 10. While for purposes of illustration only two intermediate links 18 and two arm links 20 are shown, the tool arm assembly 10 may comprise any number of intermediate links 18 and arm links 20.

Figure 2:
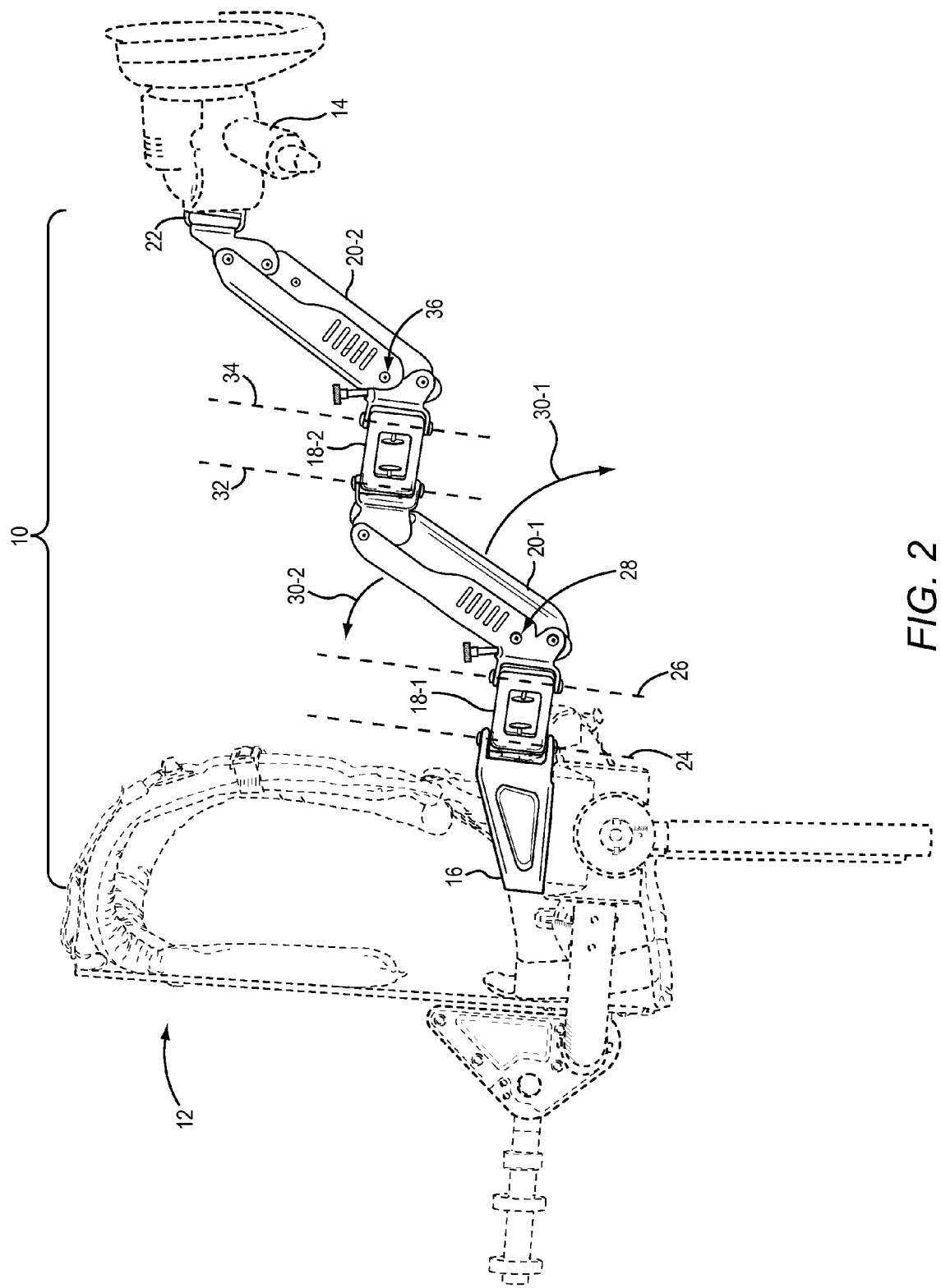
FIG. 2 is an enlarged view of the tool arm assembly illustrated in FIG. 1.

FIG. 2 is an enlarged view of the tool arm assembly 10 illustrated in FIG. 1. The intermediate link 18-1 has a rotation axis 24 and a rotation axis 26. The rotation axis 24 allows the intermediate link 18-1 to rotate with respect to the tool base link 16. In this example, the intermediate link 18-1 rotates in a generally horizontal plane. The rotation axis 26 allows the arm link 20-1 to rotate in the same generally horizontal plane with respect to the intermediate link 18-1. The arm link 20-1 can also rotate about a rotation axis 28 which is perpendicular to the rotation axis 24, and thereby move in directions 30-1, 30-2, which in this example are in a generally vertical plane.

The intermediate link 18-2 has a rotation axis 32 about which the intermediate link may rotate with respect to the arm link 20-1, and a rotation axis 34 about which the intermediate link 18-2 may rotate with respect to the arm link 20-2. The arm link 20-2 is rotatable about a rotation axis 36 that is perpendicular to the rotation axis 34.

Figure 3:
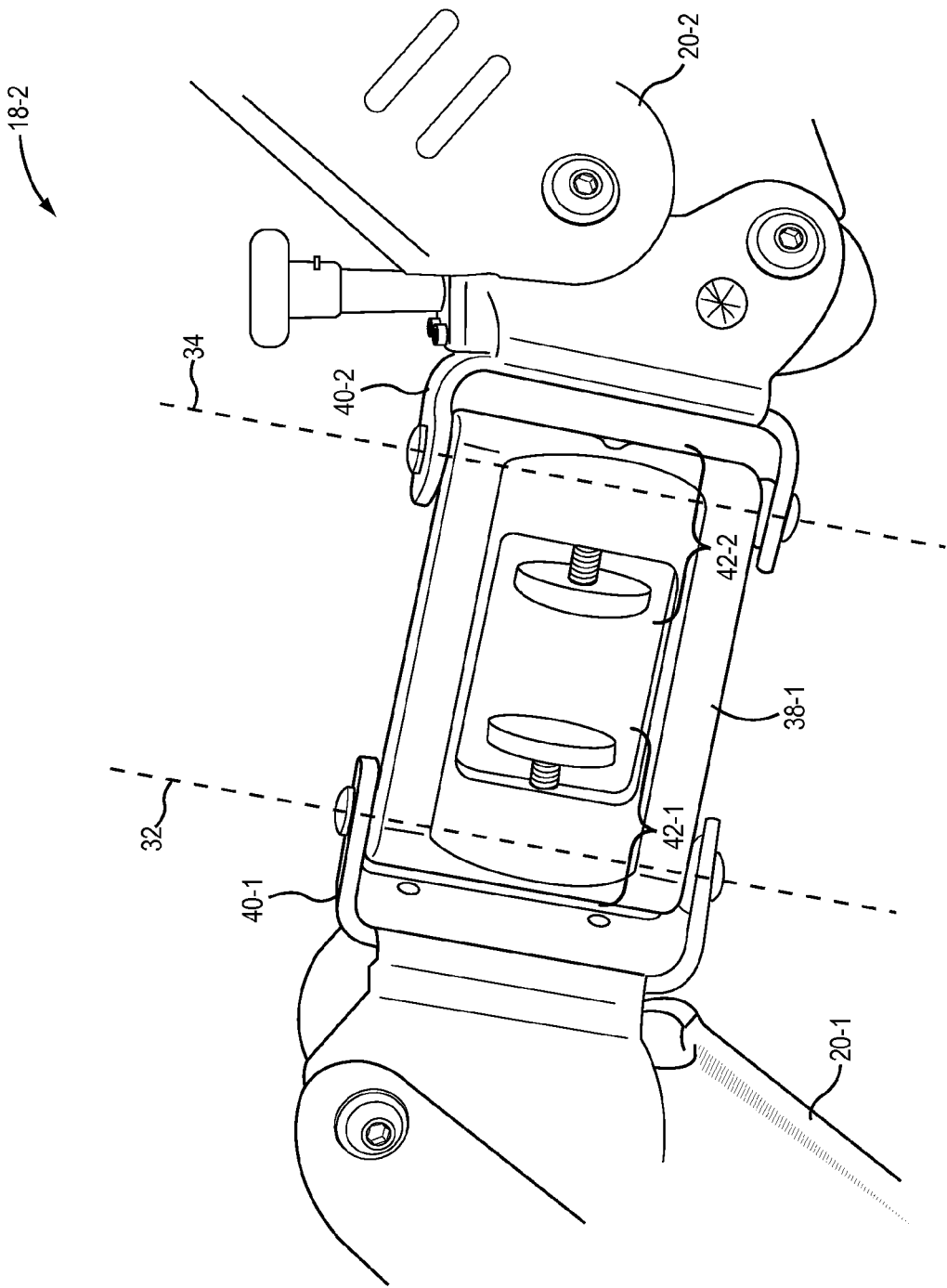
FIG. 3 is an enlarged view of the intermediate link illustrated in FIG. 2.

FIG. 3 is an enlarged view of the intermediate link 18-2. The intermediate link 18-2 includes a body 38-1 and the rotation axes 32, 34. A connector 40-1 is coupled to the body 38-1 and is at least partially rotatable about the rotation axis 32. In this example, the connector 40-1 is coupled to the arm link 20-1, but in other embodiments the connector 40-1 may be coupled to the tool base link 16. The connector 40-1 may be coupled to the arm link 20-1 or the tool base link 16 either via attachment mechanisms, such as bolts, screws, and the like, or may be coupled to the arm link 20-1 or the tool base link 16 by being integral with the arm link 20-1 or the tool base link 16, such as by being formed from the same material as that used to make all or a portion of the arm link 20-1 or the tool base link 16.

The intermediate link 18-2 also includes a connector 40-2, which is coupled to the body 38-1 and is at least partially rotatable about the rotation axis 34. In this example, the connector 40-2 is coupled to the arm link 20-2.

The intermediate link 18-2 includes a rotation lock mechanism 42-1 that is configured to selectively prevent rotation of the connector 40-1 about the rotation axis 32, and a rotation lock mechanism 42-2 that is configured to selectively prevent rotation of the first connector 40-2 about the rotation axis 34. The rotation lock mechanism 42-1 has an unlocked mode and a locked mode. In the unlocked mode, the connector 40-1 is at least partially rotatable about the rotation axis 32, and in the locked mode, the connecter 40-1 is fixed with respect to the body 38-1. Similarly, the rotation lock mechanism 42-2 has an unlocked mode and a locked mode. In the unlocked mode, the connector 40-2 is at least partially rotatable about the rotation axis and 34, and in the locked mode, the connecter 40-2 is fixed with respect to the body 38-1.

A user can thereby selectively activate the rotation mechanism 42-1 to prevent rotation of the intermediate link 18-2 with respect to the arm link 20-1 but allow rotation of the arm link 20-2 with respect to the intermediate link 18-2. Alternatively, the user can selectively activate the rotation mechanism 42-2 to prevent rotation of the intermediate link 18-2 with respect to the arm link 20-2 but allow rotation of the arm link 20-1 with respect to the intermediate link 18-2. The user may also selectively activate the rotation mechanism 42-1 to prevent rotation of the intermediate link 18-2 with respect to the arm link 20-1, and selectively activate the rotation mechanism 42-2 to prevent rotation of the intermediate link 18-2 with respect to the arm link 20-2.

Figure 4:
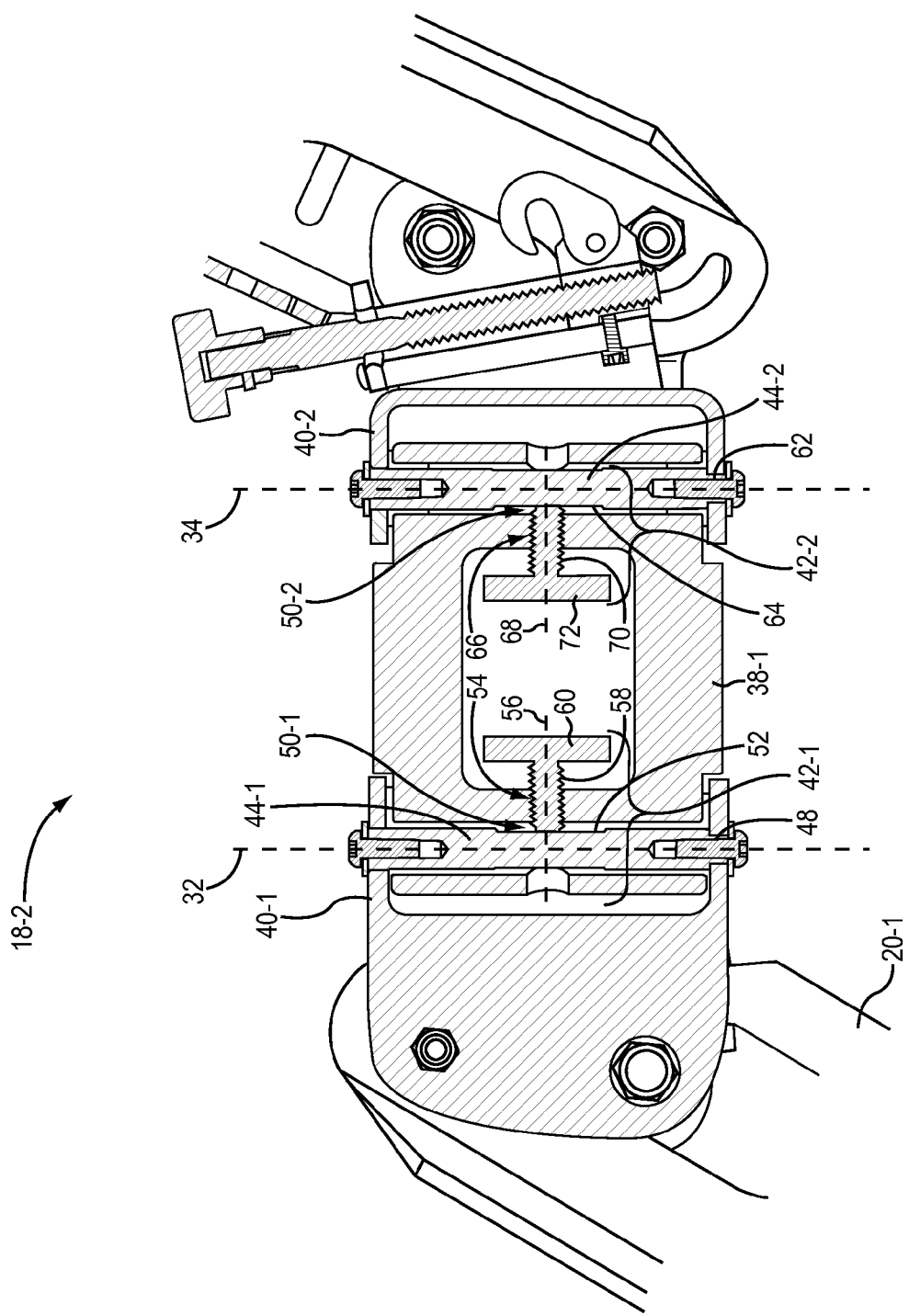
FIG. 4 is a cross-sectional view of the intermediate link illustrated in FIG. 3.

FIG. 4 is a cross-sectional view of the intermediate link 18-2 illustrated in FIG. 3. A shaft 44-1 is collinear with the rotation axis 32. The shaft 44-1 is fixed with respect to the connector 40-1 and rotatable with respect to the body 38-1, such that the shaft 44-1 rotates about the rotation axis 32 in conjunction with the connector 40-1 rotating about the rotation axis 32. In one embodiment, the shaft 44-1 may be fixed with respect to the connector 40-1 via a keyed, i.e., non-circular, cross-sectional area 48 of the shaft 44-1 that matches a non-circular opening in the connector 40-1. The shaft 44-1 includes a lock interface area 50-1 that in this embodiment comprises a flat surface 52. The body 38-1 forms a threaded bore 54 that is substantially perpendicular with respect to the rotation axis 32, and has a longitudinal axis 56 that intersects the rotation axis 32. A threaded pin 58 engages the threaded bore 54. A handle 60 is attached to the pin 58, and the pin 58 may thereby be rotated in a clockwise direction such that the pin 58 engages the flat surface 52 in a locked position to prevent rotation of the shaft 44-1 and the connector 40-1. The handle 60 may be rotated in a counter-clockwise position to disengage the pin 58 from the lock interface area 50-1 to put the pin 58 in an unlocked position.

The body 38-1 also includes a shaft 44-2 that is collinear with the rotation axis 34. The shaft 44-2 is fixed with respect to the connector 40-2 and rotatable with respect to the body 38-1, such that the shaft 44-2 rotates about the rotation axis 34 in conjunction with the connector 40-2 rotating about the rotation axis 34. As discussed above, in one embodiment, the shaft 44-2 may be fixed with respect to the connector 40-2 via a keyed, i.e., non-circular, cross-sectional area 62 of the shaft 44-2 that matches a non-circular opening in the connector 40-2. The shaft 44-2 includes a lock interface area 50-2 that in this embodiment comprises a flat surface 64. The body 38-1 forms a threaded bore 66 that is substantially perpendicular with respect to the rotation axis 34 and has a longitudinal axis 68 that intersects the rotation axis 34. A threaded pin 70 engages the threaded bore 66. A handle 72 is attached to the pin 70, and the pin 70 may thereby be rotated in a clockwise direction such that the pin 70 engages the flat surface 64 in a locked position to prevent rotation of the shaft 44-2 and the connector 40-2. The handle 72 may be rotated in a counter clockwise position to disengage the pin 70 from the lock interface area 50-2 to put the pin 70 in an unlocked position.

Figure 5:
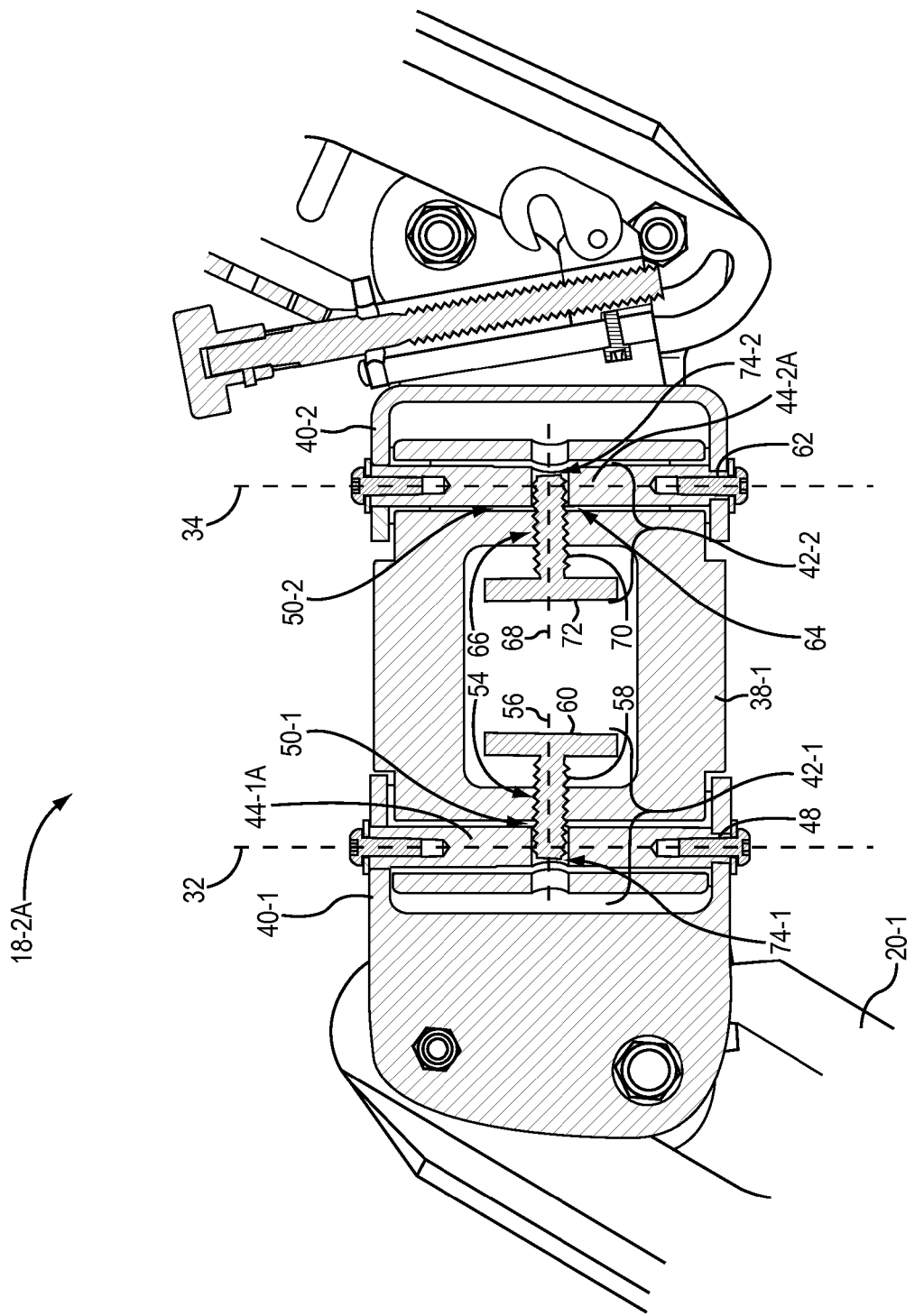
FIG. 5 is a cross-sectional view of an intermediate link according to another embodiment.

FIG. 5 is a cross-sectional view of an intermediate link 18-2A according to another embodiment. The intermediate link 18-2A is identical to the intermediate link 18-2 illustrated in FIGS. 3 and 4, except that the lock interface areas 50-1, 50-2 comprise openings 74-1, 74-2 formed in shafts 44-1A, 44-2A, respectively. The pins 58, 70 may be rotated to extend into the respective openings 74-1, 74-2 to prevent rotation of the shafts 44-1A, 44-2A.

Figure 6:
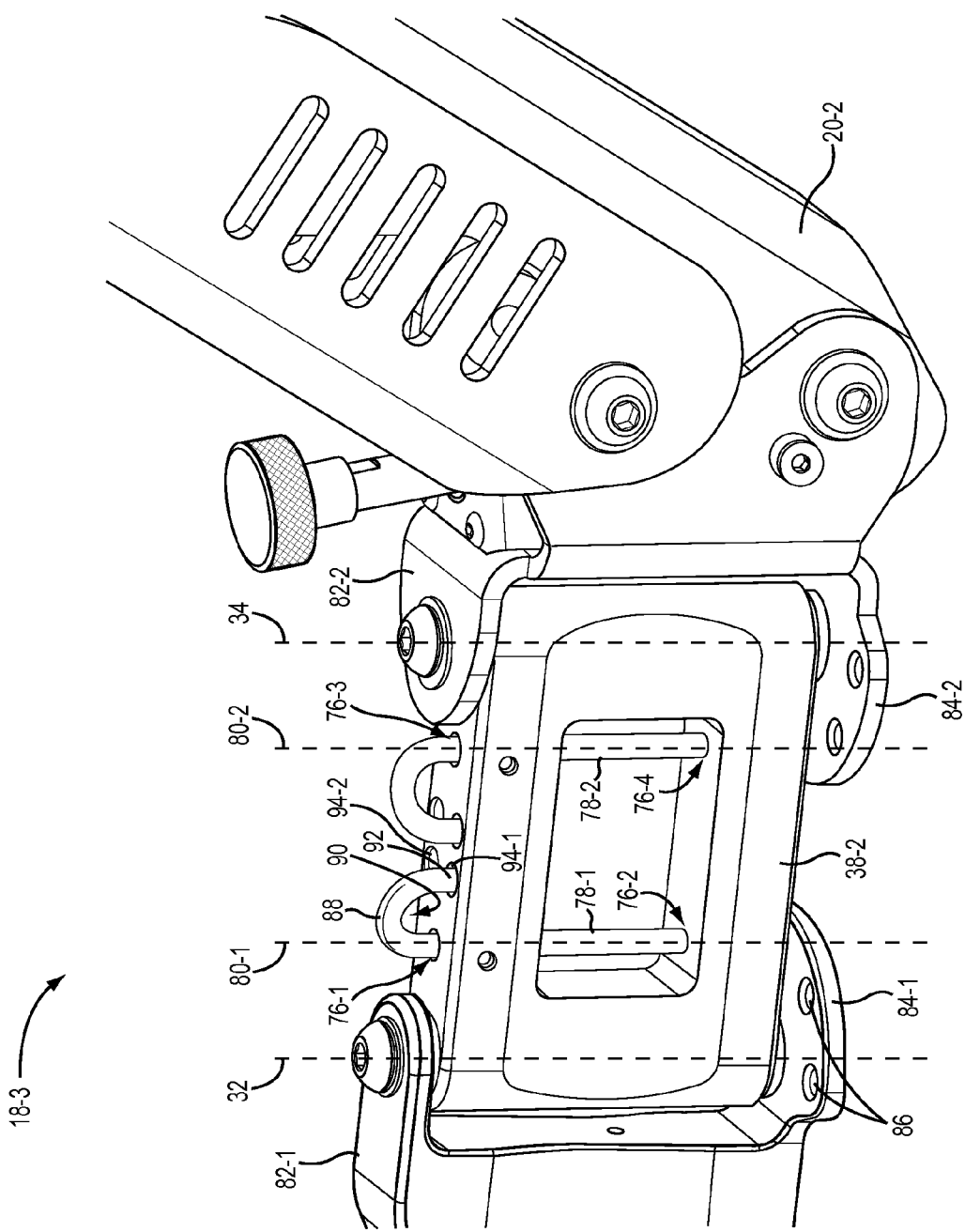
FIG. 6 is an illustration of an intermediate link according to another embodiment.

FIG. 6 is an illustration of an intermediate link 18-3 according to another embodiment. The intermediate link 18-3 is substantially similar to the intermediate links 18-2, 18-2A discussed above except as otherwise discussed herein. The intermediate link 18-3 has a body 38-2 which forms pin through holes 76-1-76-4. A pin 78-1 is slidably coupled to the body 38-2 and is configured to slide along a pin axis 80-1. A connector 82-1 is coupled to the body 38-2 and is at least partially rotatable about the rotation axis 32. A connector 82-2 is coupled to the body 38-2 and is at least partially rotatable about the rotation axis 34.

The connector 82-1 includes a bracket 84-1 that forms one or more openings 86. The connector 82-1 may be rotated about the axis 32 such that the openings 86 successively intersect the pin axis 80-1 at different rotation orientations of the connector 82-1 with respect to the body 38-2. The pin 78-1 is configured to engage an opening 86 to prevent rotation of the first connector 82-1 with respect to the body 38-2.

The pin 78-1 has a head section 88 that includes a throat 90. A pin end 92 engages one of two holes 94-1, 94-2 to place the pin 78-1 in a locked mode or an unlocked mode. The hole 94-1 is sufficiently deep to allow the pin shaft of the pin 78-1 to extend through the body 38-2 and through the opening 86 in the bracket 84-1. The hole 94-2 is a shallow hole, and thus if the pin end 92 is placed in the hole 94-2, the shaft of the pin 78-1 cannot engage the opening 86, and the connector 82-1 can rotate with respect to the body 38-2. A pin 78-2 operates with respect to a bracket 84-2 of the connector 82-2 identically to that described above with regard to the pin 78-1 and the bracket 84-1 to selectively allow rotation of the connector 82-2 with respect to the body 38-2, or to prevent rotation of the connector 82-2 with respect to the body 38-2.

Figure 7:
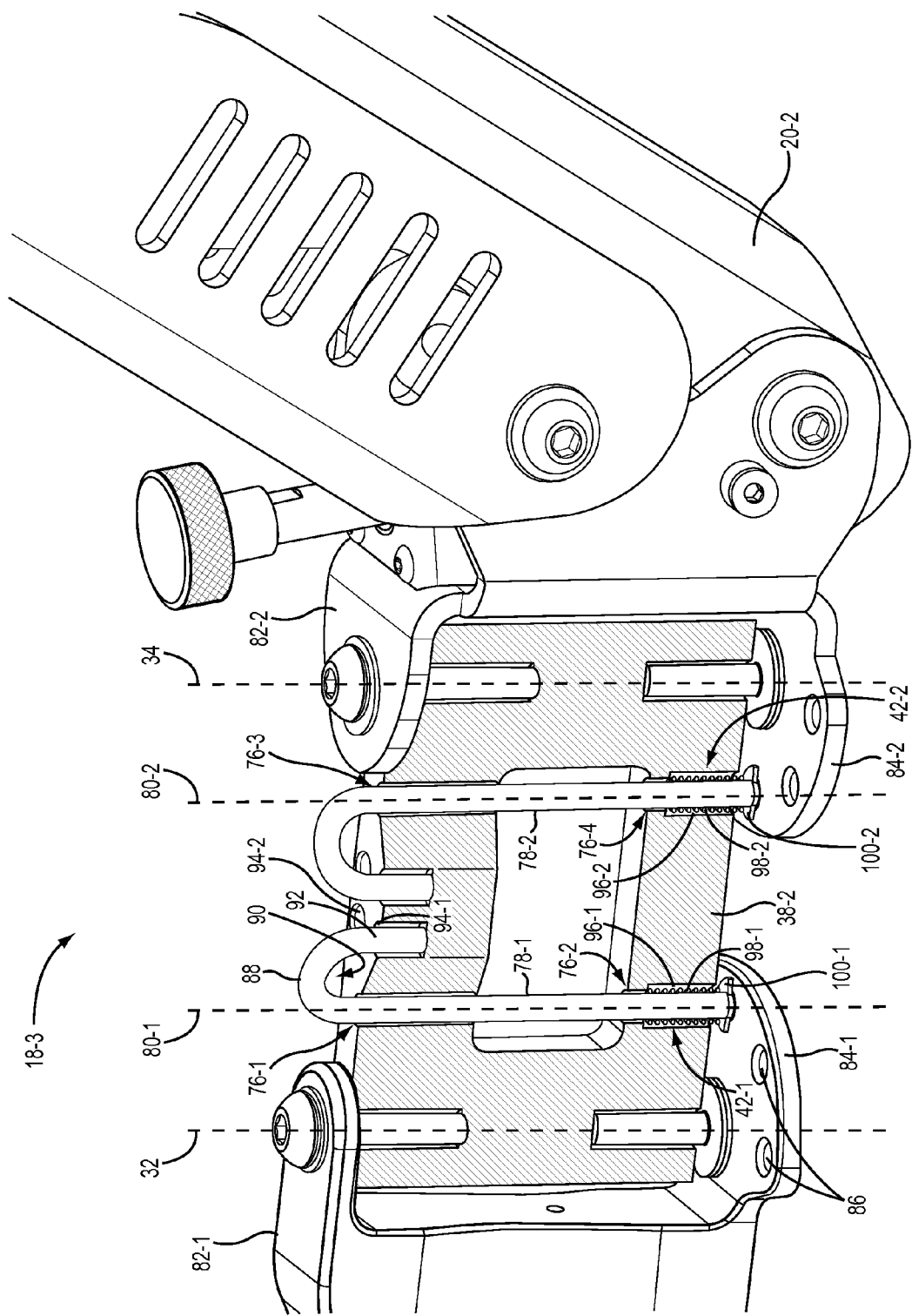
FIG. 7 is a cross-sectional view of the intermediate link illustrated in FIG. 6.

FIG. 7 is a cross-sectional view of the intermediate link 18-3 illustrated in FIG. 6. The body 38-2 forms two chambers 96-1, 96-2 in which springs 98-1, 98-2 are located, respectively. The pin 78-1 includes a collar 100-1 against which the spring 96-1 exerts a force to urge the pin 78-1 in a direction toward the bracket 84-1. Similarly, the pin 78-2 includes a collar 100-2 against which the spring 96-2 exerts a force to urge the pin 78-2 in a direction toward the bracket 84-2.

Those skilled in the art will recognize improvements and modifications to the preferred embodiments of the disclosure. All such improvements and modifications are considered within the scope of the concepts disclosed herein and the claims that follow.

What is claimed is:

1. An intermediate link for a tool arm assembly comprising:
   a body having a first rotation axis and a second rotation axis, the body forming a through hole that extends from a top surface of the body to a bottom surface of the body;
   a first connector coupled to the body, the first connector being at least partially rotatable about the first rotation axis;
   a second connector coupled to the body, the second connector being at least partially rotatable about the second rotation axis; and
   a first rotation lock mechanism comprising a first pin that is slidably coupled to the body and is positioned in the through hole, the first pin slidable along a first pin axis, the first pin having a length greater than a height of the body defined by a distance between the top surface and the bottom surface;
   wherein the first connector further comprises a first bracket forming at least one opening that intersects the first pin axis at a particular rotation orientation of the first connector with respect to the body; and
   the first pin is configured to engage the at least one opening of the first bracket to prevent rotation of the first connector with respect to the body.

2. The intermediate link of claim 1, further comprising a first shaft that is collinear with the first rotation axis, the first shaft being fixed with respect to the first connector and rotatable with respect to the body, the first shaft comprising a lock interface area, wherein the first rotation lock mechanism comprises a pin having a locked position and an unlocked position, in the locked position the pin engaged with the lock interface area to prevent rotation of the first shaft.

3. The intermediate link of claim 2, wherein the first shaft forms an opening and the lock interface area comprises the opening, and wherein in the locked position at least a portion of the pin extends into the opening.

4. The intermediate link of claim 2, wherein:
   the body forms a threaded bore that is substantially perpendicular with respect to the first rotation axis, the threaded bore comprising a longitudinal axis that intersects the first rotation axis;

the pin comprises threads configured to engage the threaded bore; and further comprising:

a handle attached to the pin, the pin extending substantially perpendicular with respect to the first rotation axis and configured to contact the first shaft upon rotation of the pin.

5. The intermediate link of claim 4, wherein the first shaft comprises a flat surface and the lock interface area comprises the flat surface, the pin configured to contact the flat surface.

6. The intermediate link of claim 1, further comprising a second rotation lock mechanism configured to selectively prevent rotation of the second connector about the second rotation axis.

7. The intermediate link of claim 6, wherein the first rotation lock mechanism has a first unlocked mode and a first locked mode, in the first unlocked mode the first connector being at least partially rotatable about the first rotation axis and in the first locked mode the first connecter being fixed with respect to the body, and wherein the second rotation lock mechanism has a second unlocked mode and a second locked mode, in the second unlocked mode the second connector being at least partially rotatable about the second rotation axis and in the second locked mode the second connecter being fixed with respect to the body.

8. The intermediate link of claim 1, wherein the first bracket forms a plurality of openings, including the at least one opening, each opening of the plurality of openings intersecting the first pin axis at corresponding rotation orientations of the first connector with respect to the body.

9. The intermediate link of claim 1, wherein the body forms a first pin through hole having a through-hole axis that is parallel to the first rotation axis, the first pin configured to slide within the through hole to engage the at least one opening.

10. The intermediate link of claim 1, further comprising:

a second rotation lock mechanism configured to selectively prevent rotation of the second connector about the second rotation axis, wherein the second rotation lock mechanism comprises a second pin that is slidably coupled to the body and is configured to slide along a second pin axis;

the second connector comprises a second bracket forming at least one opening that intersects the second pin axis at a particular rotation orientation of the second connector with respect to the body; and the second pin is configured to engage the at least one opening of the second bracket to prevent rotation of the second connector with respect to the body.

11. A tool arm assembly comprising:

a first arm link;

a second arm link; and an intermediate link comprising:

a body having a first rotation axis and a second rotation axis, the body forming a through hole that extends from a top surface of the body to a bottom surface of the body;

a first connector coupled to the body and the first arm link, the first connector being at least partially rotatable about the first rotation axis;

a second connector coupled to the body and to the second arm link, the second connector being at least partially rotatable about the second rotation axis; and a first rotation lock mechanism comprising a first pin that is slidably coupled to the body and is positioned in the through hole, the first pin slidable along a first pin axis, the first pin having a length greater than a height of the body defined by a distance between the top surface and the bottom surface;

wherein the first connector further comprises a first bracket forming at least one opening that intersects the first pin axis at a particular rotation orientation of the first connector with respect to the body; and the first pin is configured to engage the at least one opening of the first bracket to prevent rotation of the first connector with respect to the body.

12. The tool arm assembly of claim 11, wherein the first arm link is configured to rotate about a first arm rotation axis that is perpendicular to the first rotation axis.

13. The tool arm assembly of claim 12, wherein the second arm link is configured to rotate about a second arm rotation axis that is perpendicular to the second rotation axis.

14. The tool arm assembly of claim 11, wherein the intermediate link further comprises a first shaft that is co-linear with the first rotation axis, the first shaft being fixed with respect to the first connector and rotatable with respect to the body, the first shaft comprising a lock interface area, and wherein the first rotation lock mechanism comprises a pin having a locked position and an unlocked position, in the locked position the pin engaged with the lock interface area to prevent rotation of the first shaft.

15. The tool arm assembly of claim 11, further comprising a second rotation lock mechanism configured to selectively prevent rotation of the second connector about the second rotation axis.

16. A tool arm assembly comprising:

a tool interface link;

a first arm link;

a first intermediate link comprising:

a first body having a first rotation axis and a second rotation axis, the first body forming a through hole that extends from a top surface of the first body to a bottom surface of the first body;

a first connector coupled to the first body and the tool interface link, the first connector being at least partially rotatable about the first rotation axis;

a second connector coupled to the first body and to the first arm link, the second connector being at least partially rotatable about the second rotation axis;

at least one of:

a first rotation lock mechanism comprising a first pin that is slidably coupled to the first body and is positioned in the through hole, the first pin slidable along a first pin axis, the first pin having a length greater than a height of the first body defined by a distance between the top surface and the bottom surface;

wherein the first connector further comprises a first bracket forming at least one opening that intersects the first pin axis at a particular rotation orientation of the first connector with respect to the first body; and the first pin is configured to engage the at least one opening of the first bracket to prevent rotation of the first connector with respect to the first body; and a second rotation lock mechanism configured to selectively prevent rotation of the second connector about the second rotation axis;

a second arm link;

a second intermediate link comprising:

a second body having a third rotation axis and a fourth rotation axis;

a third connector coupled to the second body and the first arm link, the third connector being at least partially rotatable about the third rotation axis;

a fourth connector coupled to the second body and to the second arm link, the fourth connector being at least partially rotatable about the fourth rotation axis; and at least one of:
  a third rotation lock mechanism configured to selectively prevent rotation of the third connector about the third rotation axis; and
  a fourth rotation lock mechanism configured to selectively prevent rotation of the fourth connector about the fourth rotation axis.

17. The tool arm assembly of claim 16, wherein the second arm link further comprises a tool attachment interface configured to interface with a tool.

18. The tool arm assembly of claim 16, wherein the first intermediate link further comprises a first shaft that is collinear with the first rotation axis, the first shaft being fixed with respect to the first connector and rotatable with respect to the first body, the first shaft comprising a lock interface area, wherein the first rotation lock mechanism comprises a pin having a locked position and an unlocked position, in the locked position the pin engaged with the lock interface area to prevent rotation of the first shaft.

19. The intermediate link of claim 1 wherein the first pin comprises a first end having a curved head section and a second end that is straight, the body forms a first hole in the top surface having a first depth sufficient to allow a portion of the curved head section to be positioned in the hole and the second end to engage the at least one opening of the first bracket.

20. The intermediate link of claim 19 wherein the body forms a second hole in the top surface having a second depth that is a shallower depth than the first depth that allows a portion of the curved head section to be positioned in the hole and prevents the second end from engaging the at least one opening of the first bracket.

21. The intermediate link of claim 19 further comprising a collar fixed to the first pin, and further comprising a spring configured to exert a force on the collar to urge the second end in a direction toward the first bracket.

* * * * *